United States Patent [19]

Rediger

[11] Patent Number: 4,477,306
[45] Date of Patent: Oct. 16, 1984

[54] LAMINATED CORE, APPARATUS AND METHODS

[75] Inventor: Alvin L. Rediger, Zeeland, Mich.

[73] Assignee: General Electric Company, Fort Wayne, Ind.

[21] Appl. No.: 402,466

[22] Filed: Jul. 28, 1982

Related U.S. Application Data

[62] Division of Ser. No. 183,176, Sep. 2, 1980.

[51] Int. Cl.$^3$ ............................................. H02K 15/00
[52] U.S. Cl. .................................... 156/578; 118/256; 118/401
[58] Field of Search ................ 156/578; 118/401, 407, 118/410–412, DIG. 2, 256–257

[56] References Cited

U.S. PATENT DOCUMENTS

| | | | |
|---|---|---|---|
| 2,989,940 | 6/1961 | Williams | 118/262 X |
| 3,490,143 | 1/1970 | Hull | 29/596 |
| 3,512,902 | 5/1970 | Emmons et al. | 29/596 X |
| 3,518,754 | 7/1970 | Pleiss et al. | 29/596 |
| 3,573,129 | 3/1971 | Zeis | 156/578 X |
| 3,737,987 | 6/1973 | Bednarski | 29/596 |
| 3,778,892 | 12/1973 | Ostroski | 156/295 X |
| 3,821,846 | 7/1974 | Pleiss et al. | 29/596 |
| 3,953,275 | 4/1976 | Henderson et al. | 156/278 |
| 4,055,144 | 10/1977 | Chu et al. | 118/401 |
| 4,085,347 | 4/1978 | Lichius | 310/259 |
| 4,339,299 | 7/1982 | Snellman et al. | 118/257 X |

FOREIGN PATENT DOCUMENTS 1201935  8/1970  United Kingdom ................ 118/401

OTHER PUBLICATIONS

"Anaerobic Adhesive System for Assembling Armatures", pp. 47–51, by William H. O'Connor; This Paper was Presented at the International Coil Winding Conference in Boston, Mass. in Oct. of 1979.
"Appliance Manufacturer", Feb., 1980, pp. 83, 84.

Primary Examiner—David Simmons
Attorney, Agent, or Firm—Ralph E. Krisher, Jr.

[57] ABSTRACT

A method of presenting a hardenable adhesive material on a surface of a flow wall for supporting at least one beaded column of the hardenable adhesive material adapted in part for transfer by capillary action to a magnetic core for use in an electrical inductive device. In this method, the hardenable adhesive material is directed onto the surface of the flow wall, and the hardenable adhesive material flows downwardly in the at least one beaded column along the surface of the flow wall. The flow of the at least one beaded column of the hardenable adhesive material is then redirected angularly away from the surface of the flow wall.

Apparatus, a laminated core, and other methods are also disclosed herein.

2 Claims, 14 Drawing Figures

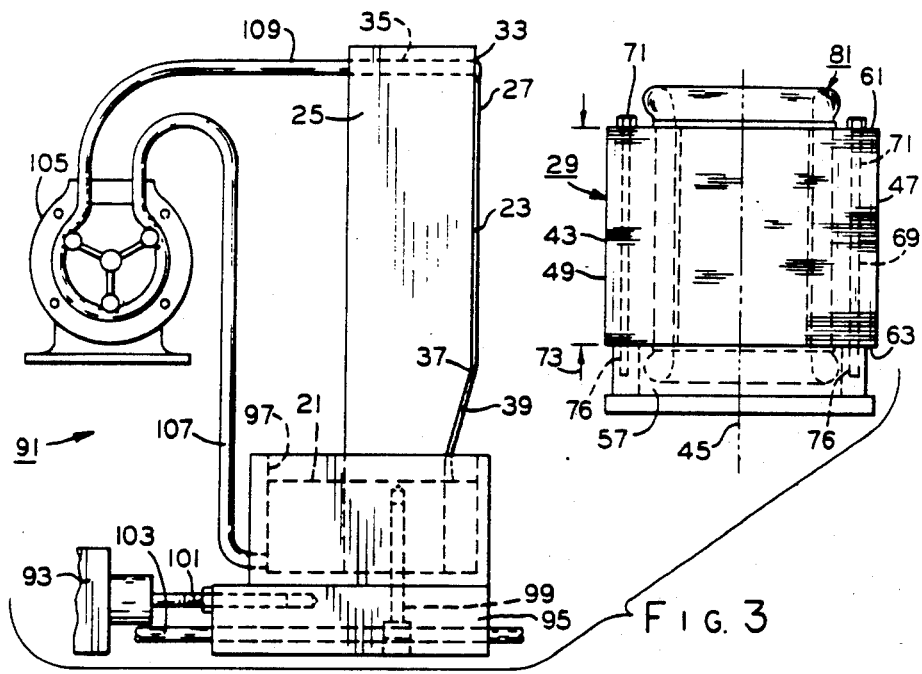
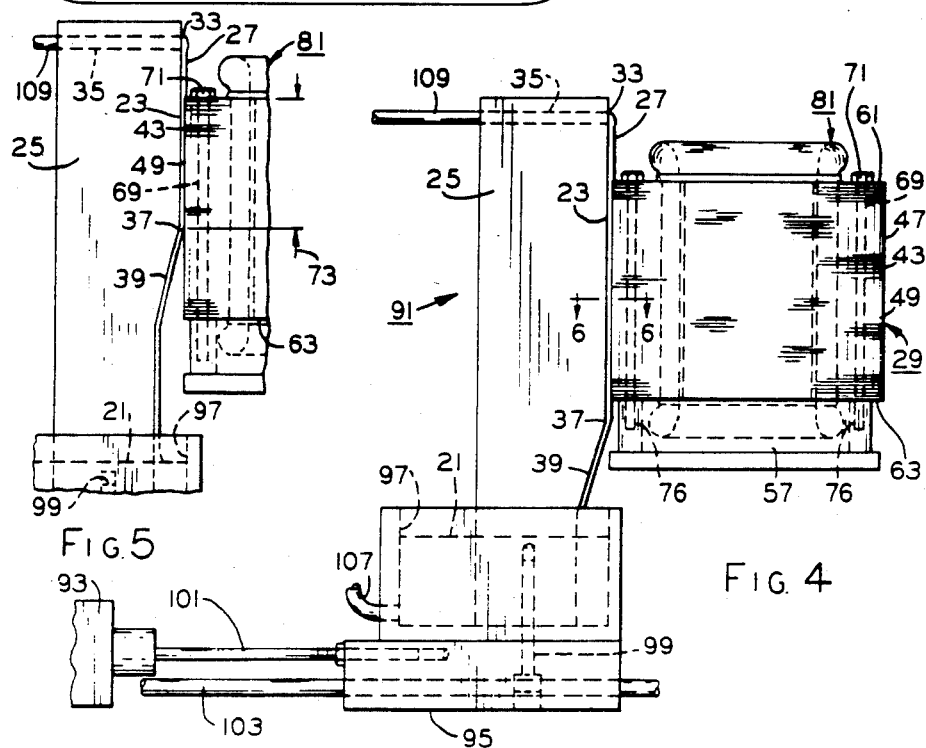

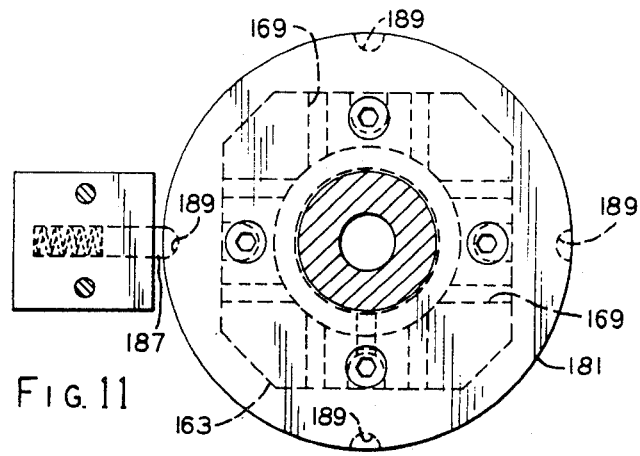
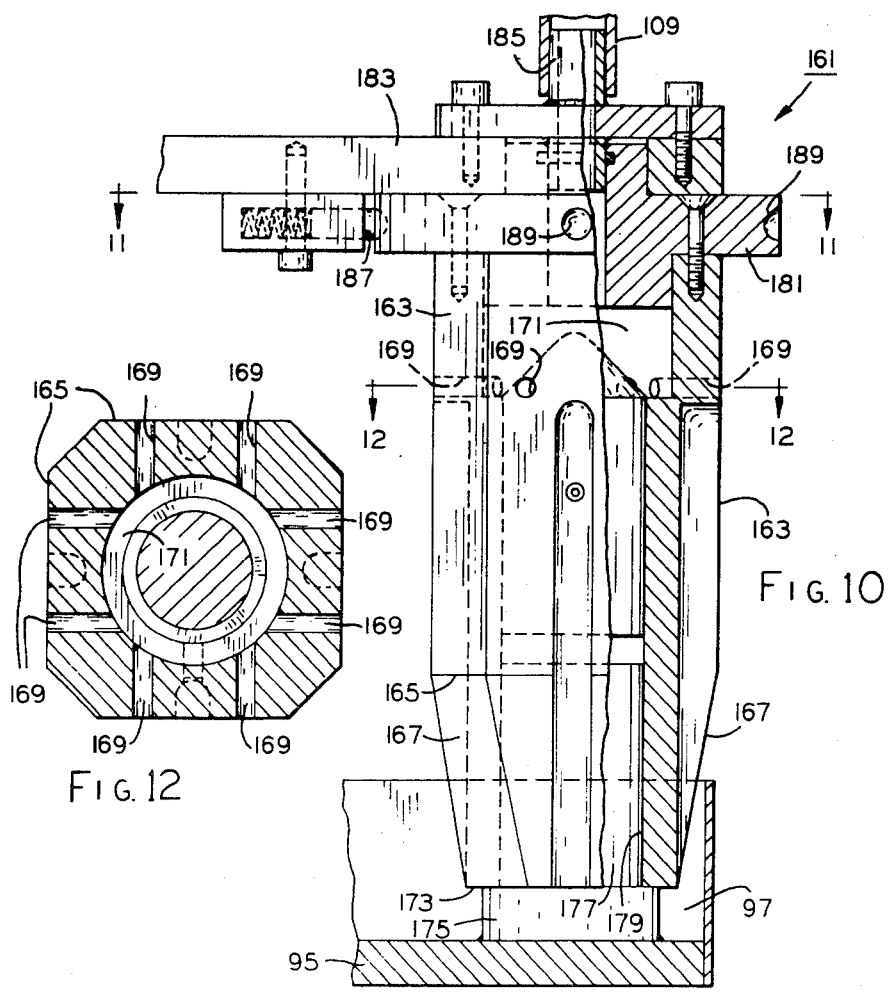
FIG. 11
FIG. 12
FIG. 10

LAMINATED CORE, APPARATUS AND METHODS

This is a division, of application Ser. No. 183,176, filed Sept. 2, 1980.

FIELD OF THE INVENTION

This invention relates in general to electrical inductive devices and in particular to a laminated core for use therein as well as apparatus and methods involved in the manufacture of such core.

BACKGROUND OF THE INVENTION

In the past, various techniques were utilized to adhesively bond the individual laminations of a stator core together in an axially stacked relation against separation. For the most part, bonded stator cores and an associated rotor were employed in hermetic motors for driving refrigerant or hermetic compressor assemblies. The bonded core was provided with a plurality of bolt holes therethrough for receiving bolts adapted to mount the bonded stator in cantilever fashion to a stationary frame of the compressor assembly. The rotor was rotatably disposed within a bore of the bonded stator core, and the rotor was also mounted in cantilever fashion on a shaft therefor which was connected so as to drive the compressor assembly.

U.S. Pat. No. 3,490,143 and U.S. Pat. No. Re. 26,788 issued to Bobbie B. Hull are representative examples of the prior art concerning bonded stator cores. These prior art patents teach the desirability of generally isolating adhesive bonding material from bolt compression regions of the bonded stator core between its next adjacent laminations immediately adjacent the bolt holes through the bonded stator core. The isolation of the adhesive bonding material from these bolt compression regions is believed to be necessary since such regions are affected by compressive forces exerted thereon by the torqued-down mounting bolts when the bonded stator core is mounted in the cantilevered fashion onto the stationary frame of the compressor assembly, as discussed above. For instance, if adhesive bonding material was present in the aforementioned bolt compression regions during normal usage of the bonded stator core in the compressor assembly, thermoplastic flow of the adhesive bonding material away from such regions might possibly occur and may cause a loss of mounting bolt torque thereby to result in relative slippage of the individual laminations of the bonded stator core. This relative slippage of the individual laminations is, of course, believed to be a disadvantageous or undesirable feature which may result in misalignment between the bore of the bonded stator core and the rotor associated therewith causing degradation of the motor performance or perhaps the failure of the motor. Bonded stator cores which exhibit the above discussed disadvantageous feature are referred to as having a high compressibility characteristic.

In an effort to overcome the above discussed high compressibility characteristic present in some of the prior art bonded stator cores, various manufacturing techniques have been proposed for applying adhesive bonding material to the edges of lamination stacks of a stator core in such a way as to keep the adhesive bonding material from migrating into the bolt compression regions subjected to the compressive mounting forces, as previously mentioned. These manufacture techniques include: exerting greater than normal bolt-down clamping forces on the lamination stack of the stator core prior to application thereto of the adhesive bonding material to minimize migration of the adhesive bonding material into the bolt compression regions; applying similar higher bolt-down clamping forces after the application of the adhesive bonding material but before hardening thereof so as to squeeze the adhesive bonding material out of the bolt compression regions; or applying controlled, metered amounts of the adhesive bonding material to the lamination stack with such amount being insufficient to effect migration of the adhesive bonding material fully into the bolt compression regions.

Typically, in these prior art manufacturing techniques or processes, a liquid adhesive bonding material was employed having a solvent carrier and a solids content of a relatively low percentage. One suggested reason for using a liquid adhesive bonding material having a low solids content-solvent carrier is believed to be that it enhanced the capillary action which effects the penetration of such adhesive bonding material into the interlaminar surfaces of the stator core. A representative teaching to this effect is found in U.S. Pat. No. 4,085,347 which discloses the use of a carefully controlled or metered amount of adhesive bonding material to keep such material away from the bolt compression regions of the stator core. This reference teaches that while shear strength of the stator core tends to increase as the solids content of the liquid adhesive bonding material increases, the capillary migration is reduced accordingly; and, the reference also teaches that a liquid adhesive bonding material be used having a concentration of solids in the range of about 20%-30% by weight to provide uniform distribution, rapid migration, and adequate shear strength per unit of bonding area. This prior art patent emphasizes the desirability of covering a substantial percentage of the interlaminar surface area, at least 50% of the area between adjacent bolt holes up to as much as all the surface area except for the bolt compression regions. Another exemplary prior art U.S. Pat. No. 3,573,129, while not referring to specific solids contents, teaches the use of epoxy-type varnishes of syrupy consistency and further teaches that the capillary action during the "wicking" step can be facilitated by creating a temperature differential between the liquid adhesive bonding material and the lamination stack of the stator core giving, as one example, an adhesive at room temperature with the stack warmed to between 200° F. and 400° F. (93° C.–204° C.). It may be noted that this prior art patent disclosure combines the use of a carefully controlled or metered amount of liquid adhesive bonding material followed by application of high compressive forces after the "wicking" step to squeeze the liquid adhesive bonding material away from the bolt compression regions.

Thus the prior art, in the manufacture of bonded stator cores, has taught the enhancement of capillary action as a means of applying as much adhesive bonding material as possible to the interlaminar surfaces of the stator core to attain necessary shear strength properties therefor while at the same time avoiding the introduction or retention of adhesive bonding material in the bolt compression regions of the stator core so as to attain a desired low compressibility characteristic. This above discussed dichotomy with respect to adhesive application criteria has resulted in rather complex and intricate manufacturing apparatus and processes, and it is believed that such apparatus and processes have not proven entirely satisfactory for high volume-low cost production of bonded stator cores which possess the desired properties of adequate shear strength and low compressibility characteristics while at the same time having a desired degree of axial alignment and end face squareness.

In presently known adhesive bonding techniques or manufacturing processes, the bolt compression regions of the stator core is subjected to compressive forces that equal and sometimes exceed the mounting forces encountered in the field during normal use. It is believed that the need for this step introduces disadvantageous or undesirable features or complexities in the manufacturing process, which may be prudent to avoid. It is also believed that employing this step may have a tendency to produce stator cores which are not as uniformly aligned and squared as may be desired by the end user.

In addition, while many of the prior art manufacturing techniques purport to lend themselves to a high volume production line, it is believed that such techniques often may require excessive handling of the lamination stacks during various aspects of the alignment, bonding and hardening phases of the stator core manufacture. Also, in at least some of these prior art techniques, it is believed that relatively long times may be required to effect the application of the bonding material and for the ensuing hardening thereof.

SUMMARY OF THE INVENTION

Among the several objects of the present invention may be noted the provision of an improved laminated core, an improved method of manufacturing a core, an improved method of presenting a hardenable adhesive material adapted for transfer to a core, an improved method of transferring a hardenable adhesive material to a core, an improved apparatus, and an improved method of operating such apparatus which overcome at least some of the above discussed disadvantageous or undesirable feature of the prior art; the provision of such improved core, apparatus and methods in which a hardenable adhesive material is presented as a beaded column flowing downwardly along a surface of a flow wall and adapted for transfer by capillary action into such core; the provision of such improved core, apparatus and methods in which only the beaded column of the hardenable adhesive material is only momentarily touched with a peripheral portion of such core to effect the transfer thereinto by the capillary action of the part of the hardenable adhesive material from the beaded column thereof; the provision of such improved core, apparatus and methods in which such touching occurs across a width of a selected contact surface on the beaded column of the hardenable adhesive material and along a preselected axial contact length of the core peripheral portion; the provision of such improved core, apparatus and methods in which the penetration of the hardenable adhesive material by the capillary action into the core is primarily determined only by the width of the selected contact surface of the beaded column of hardenable adhesive material; the provision of such improved core, apparatus and methods in which the flow wall supporting the beaded column of the hardenable adhesive material is maintained in predetermined spaced apart relation with the peripheral portion of the core upon the touching therewith of the beaded column; the provision of such improved core, apparatus and methods in which little heat is transferred from the core to the flow wall or the beaded column of hardenable adhesive material flowing thereon during the touching of the core and the beaded column; the provision of such improved apparatus and methods in which the flow wall and the hardenable adhesive material remain relatively clean for relatively long periods of time; and the provision of such improved apparatus which is easily shut down and restarted. These as well as other objects and advantageous features of the present invention will be in part apparent and in part pointed out hereinafter.

In general, a method is provided in one form of the invention for presenting a hardenable adhesive material on a surface of a flow wall for supporting at least one beaded column of the hardenable adhesive material adapted in part for transfer by capillary action into a laminated magnetic core for use in an electrical inductive device. In this method, the hardenable adhesive material is directed onto the surface of the flow wall, and then the hardenable adhesive material is flowed downwardly in the at least one beaded column along the surface of the flow wall. Thereafter, the flow of the at least one beaded column of the hardenable adhesive material is redirected angularly away from the surface of the flow wall.

Also in general and in one form of the invention, a method is provided for transferring by capillary action a part of a hardenable adhesive material from at least one beaded column thereof into a magnetic core adapted for use in an electrical inductive device with the core including a plurality of laminations in stacked relation along an axis and having peripheral edges defining a peripheral surface of the core. In this method, the hardenable adhesive material is flowed downwardly, and the at least one beaded column is formed along at least one preselected flow path for the hardenable adhesive material. At least a part of the at least one beaded column of the hardenable adhesive material in the at least one preselected flow path thereof is touched together, with the core peripheral surface along a preselected contact length thereof.

Further in general, a method is provided in one form of the invention for operating apparatus including a source of hardenable adhesive material and a flow wall for supporting at least one beaded column of the hardenable adhesive material while a part of the hardenable adhesive material is being transferred by capillary action from the beaded column into a laminated magnetic core adapted for use in an electrical induction device. In this method, the hardenable adhesive material is circulated from its source to the flow wall, and the at least one beaded column is formed when the hardenable adhesive material is circulated to the flow wall. The at least one beaded column is flowed downwardly along the flow wall for transferring the part of the hardenable adhesive material into the laminated magnetic core by capillary action.

Still further and in general, apparatus in one form of the invention is provided for transferring by capillary action a hardenable adhesive material into a magnetic core adapted for use in an electrical inductive device with the core including a plurality of laminations in stacked relation along an axis and having edges defining a peripheral portion of the core. In this apparatus, means is provided for supporting a flow of at least one beaded column of the hardenable adhesive material downwardly thereon generally in at least one preselected flow path, and means is operable generally for effecting engagement of the core peripheral portion along at least one preselected axial contact length thereof and the at least one beaded column of the hardenable adhesive material in the at least one preselected flow path thereof on the supporting means so as to effect the transfer of a part of the hardenable adhesive material from the at least one beaded column by the capillary action into the core between next adjacent laminations adjacent the at least one preselected axial contact length of the core peripheral surface.

Still further and in general, apparatus is provided for manufacturing a magnetic core adpated for use in an electrical conductive device with the core including a plurality of laminations in stacked relation along an axis and having edges defining a peripheral surface of the core. In this apparatus, a plurality of work stations are provided, and conveyor means is movable through the work stations. Means associated with the conveyor means is movable therewith through the work stations for mounting the core in a preselected position. Means at least one of the work stations is provided for preheating the core upon the movement thereof to the at least one work station by the conveyor means, and means is provided at another of the work stations for tranferring by capillary action a hardenable adhesive material into the core upon the movement of the core to the another work station by the conveyor means. The transferring means includes at least one means for supporting a flow of at least one beaded column of the hardenable adhesive material downwardly thereof generally in a preselected flow path and means operable generally for moving the at least one flow supporting means from a retracted position into a protracted position, the at least one flow supporting means in the protracted position thereof being disposed in predetermined spaced apart relation with the core peripheral surface so as to tough the at least one beaded column of the hardenable adhesive material with a preselected axial contact length of the core peripheral surface thereby to effect the transfer by the capillary action of a part of the hardenable adhesive material, from the at least one beaded column thereof into at least one adhesive region of the core between next adjacent laminations along the preselected axial contact length and at least generally adjacent the core peripheral surface. The transferring means also includes means for receiving the unused hardenable adhesive material flowing in the at least one beaded column from the flow supporting means, and means for circulating the hardenable adhesive material from the receiving means back to the at least one flow supporting means so as to maintain the flow of the at least one beaded column of the hardenable adhesive material downwardly in the preselected flow path on the at least one flow supporting means. Means at yet another of the work stations is provided for heating the core to effect the curing of the hardenable adhesive material in the at least one adhesive region of the core upon the movement of the core to the yet another work station by the conveyor means.

Also in general, a laminated core in one form of the invention is provided with a plurality of laminations in stacked relation along an axis with the individual laminations each having a number of angularly spaced apart apertures aligned to define a number of selected passageways extending axially through the core. The laminations have pressure regions respectively disposed in the vicinity of the selected passageways adapted to receive predetermined compressive forces applied thereto. A plurality of lamination adhesive regions are located between at least some next adjacent laminations and angularly between at least some of the pressure regions. The adhesive regions have hardened adhesive material adhering to the at least some next adjacent laminations with the size of the adhesive regions being primarily determined by the width of a selected contact surface of a beaded column of the adhesive material in an unhardened state fed to the adhesive regions by capillary action from an associated peripheral surface of the core whereby the adhesive regions allow the pressure regions to be effective for a range of the predetermined compressive forces applied thereto.

BRIEF DESCRIPTION OF THE DRAWINGS

FIGS. 3 and 4 are schematic side elevational views illustrating apparatus in one form of the invention for transferring a hardenable adhesive material into the magnetic core of FIG. 1 and also teaching princiles which may be practiced in a method of presenting the hardenable adhesive material and in a method of transferring the hardenable adhesive material in one form of the invention, respectively;

FIG. 5 is a partial side elevational view illustrating an alternative embodiment in one form of the invention of the apparatus of FIG. 3 and showing the transfer of hardenable adhesive material to only a part of the axial length of the core peripheral portion;

FIG. 10 is a partial sectional view of a flow wall of the apparatus of FIG. 3;

FIGS. 11 and 12 are sectional views taken along lines 11—11 and 12—12 of FIG. 10, respectively;

Corresponding reference characters indicate corresponding parts throughout the several views of the drawings.

Figure 1:
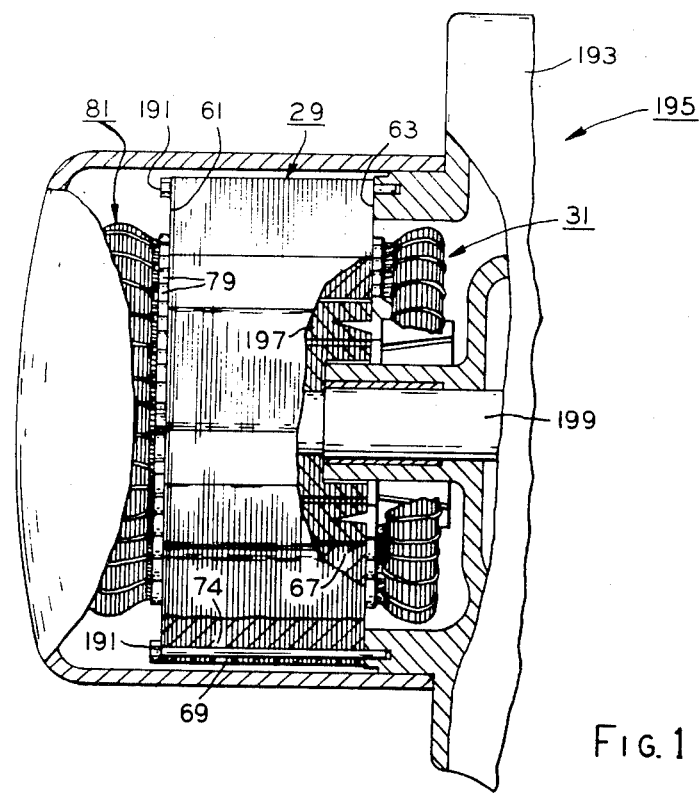
FIG. 1 is a partial sectonal view of a hermetic compressor illustrating a hermetic motor with a magnetic core in one form of the invention mounted to an end frame of the hermetic compressor.

The exemplifications set out herein illustrate the preferred embodiments of the invention in one form thereof, and such exemplifications are not to be construed as limiting the scope of the disclosure of the invention in any manner.

DETAILED DESCRIPTION OF THE PREFERRED EMBODIMENTS

Referring now to the drawings in general, a method in one form of the invention is illustrated for presenting a hardenable adhesive material 21 on a surface 23 of a means, such as for instance a flow wall 25, for supporting at least one beaded column 27 of the hardenable adhesive material adapted for transfer by capillary action to a magnetic core 29 for use in an electrical inductive device, such as an electric motor 31 for instance (FIGS. 1–11). In this method, hardenable adhesive material 21 is directed or otherwise passed or supplied onto surface 23 of flow wall 25, and the hardenable adhesive material flows downwardly in the beaded column 27 thereof along the surface of the flow wall (FIGS. 3–8). The flow of beaded column 27 of hardenable adhesive material 21 is then redirected angularly away from surface 23 of flow wall 25 (FIGS. 3–5).

More particularly and with specific reference to FIGS. 3–6, upper surface 23 of flow wall 25 is generally planar and arranged in a generally vertical position, and the downward flow of hardenable adhesive material 21 in beaded column 27 thereof is maintained on or otherwise supported on the upper surface; however, it is contemplated that the upper surface of the flow wall may be tilted to an angular position away from the vertical within the scope of the invention so as to meet at least some of the objects thereof. Beaded column 27 of hardenable adhesive material 21 emanates from an outlet port 33 intersecting with upper surface 23 generally adjacent the upper end of flow wall 25, and means, such as for instance a passage 35 or the like which includes the outlet port, is provided in the flow wall for the passage therethrough of a flow of the hardenable adhesive material, as discussed in greater detail hereinafter. Thus, as the flow of hardenable adhesive material 21 through passage 35 is discharged or otherwise passed through outlet port 33 so as to be directed onto upper surface 23 of flow wall 25, it may be noted that the hardenable adhesive material flow is formed, shaped, developed or otherwise established into beaded column 27 flowing downwardly in a generally elongate preselected flow path along the upper surface. Of course, outlet port 33 generally defines an upper end or margin on upper surface 23 over which the flow of hardenable adhesive material 21 passes when formed into beaded column 27 thereof supported on the upper surface. The length of the preselected flow path of beaded column 27 along upper surface 23 is predetermined so as to extend between the aforementioned upper margin and a predeterminately spaced apart lower margin defined by an edge or intersection 27 on flow wall 25 between another lower surface 39 thereon and the upper surface. It may be noted that lower surface 39 is arranged in a predetermined angular relation with upper surface 23; therefore, as beaded column 27 of hardenable adhesive material 21 passes or otherwise flows from the upper surface over lower margin or edge 37 onto the lower surface, the beaded column continuing to flow generally downwardly along the lower surface is directed or angled away from that part of the beaded column flowing downwardly along the upper surface. Beaded column 27 of hardenable adhesive material 21 is also supported on lower surface 39 flowing therealong until it is discharged or otherwise falls from the lower end of flow wall 25.

Figure 7:
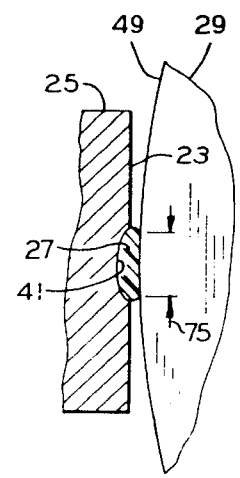
FIG. 7 is the same as FIG. 6 illustrating an alternative embodiment also in one form of the invention in which a shallow channel is provided in the flow wall of the apparatus of FIG. 4.

In view of the foregoing it may be noted that beaded column 27 of hardenable adhesive material 21 flowing downwardly in the preselected path thereof along upper surface 23 of flow wall 25 is thus presented so as to be adapted for transfer by capillary action into core 29, as discussed in greater detail hereinafter. While only one beaded column 27 of hardenable adhesive material 21 and the preselected flow path thereof on flow wall 25 is discussed hereinabove for purposes of disclosure, it is contemplated that several such beaded columns may be flowed downwardly in respective preselected flow paths generally in spaced apart side-by-side relation on the flow wall so as to be simultaneously presented for transfer by capillary action into a core 29 within the scope of the invention so as to meet at least some of the objects and advantageous features thereof. Hardenable adhesive material 21 is available from Polymer Products Division of Amicon Corporation, Lexington, Mass. under the trademark UNISET 801-04-1. This material has a thermoresponsive temperature of 138° C., a gel time of three minutes and a cure time of five minutes. It's viscosity is 17,000 cps measured at 25° C. using a Brookfield Spindle No. 3 at 20 rpm, and this material has been found to have an adequate shelf life of about two months at 22° C. and about two weeks at 38° C. While this material has been successfully employed in the practice of this invention, it is contemplated that other such materials may be utilized in the practice of this invention so as to meet at least some of the objects thereof. Furthermore and as illustrated in FIG. 7, it is also contemplated that a generally shallow elongate channel 41 may be provided, if desired, in upper and lower surface 23, 39 of flow wall 25 and intersecting with outlet port 33 thereby to positively direct or otherwise define the preselected flow path of beaded column 27 of hardenable adhesive material 21 downwardly along the upper and lower surfaces.

With reference again in general to the drawings and recapitulating at least in part with respect to the foregoing, a method in one form of the invention is illustrated for transferring by capillary action a part of hardenable adhesive material 21 from beaded column 27 thereof into core 29 adapted for use in motor 31 with the core including a plurality of laminations 43 in stacked relation along an axis 45 and having peripheral edges 47 defining a peripheral portion or surface 49 of the core (FIGS. 1–9). In this method, hardenable adhesive material 21 is flowed downwardly, and beaded column 27 of the hardenable adhesive material is formed along a preselected flow path therefor (FIGS. 3–9). At least a part of beaded column 27 of hardenable adhesive material 21 in the preselected flow path thereof and core peripheral surface 47 along a preselected axial contact length 49 thereof are touched together or otherwise engaged or contacted (FIGS. 4–7).

In order to assemble a core 20 for use in the aforementioned method of transferring hardenable adhesive material 21 thereto, laminations 43 are lanced or otherwise formed from a ferromagnetic material and may be of a suitable thickness. Laminations 43 each include outer peripheral edge 47, an inner peripheral edge defining a plurality of angularly spaced apart teeth 51 having inner ends 53, and a plurality of other peripheral edges respectively defining angularly spaced apart openings 55 which extend through such each lamination between the inner and outer peripheral edges thereof. While laminations 43 are provided with the particular configuration illustrated herein merely for the purpose of disclosure, it is contemplated that other laminations having various other configurations may be utilized in the formation of a core for use within the scope of this invention so as to meet at least some of the objects thereof.

Subsequent to the lancing of laminations 43 from the ferromagnetic material, the laminations may be assembled, mounted or otherwise arranged in stacked relation on suitable means for supporting them, such as for instance an assembly base or conveyor fixture 57 or the like, thereby to form a core stack 59 having a preselected height or axial length. Upon this assembly of core stack 59, a desired alignment of laminations 43 about axis 45 as well as a desired squared or parallel condition between a pair of opposite end faces 61, 63 of the core stack may be obtained by using known techniques. When core stack 59 is so squared with the various peripheral edges of laminations 43 in alignment, teeth 51 of the laminations define therebetween a plurality of winding receiving slots 65 which extend axially between opposite end faces 61, 63 of the core stack, and inner ends 53 of the teeth define in part a rotor accommodating bore 67 which also extends axially between the opposite end faces of the core stack and which intersects with the winding receiving slots. Opening 55 of laminations 43 are also respectively aligned with each other thereby to provide a plurality of passageways or bolt holes 69 extending axially through core stack 59 between opposite end faces 61, 63 thereof. Of course, prior to the assembly of core stack 59, laminations 43 thereof may be afforded different pretreatments, such as for instance degreasing, annealing or bluing in a known manner.

With core stack 57 mounted in the aligned and end face squared condition thereof on assembly base 59, as discussed above, a plurality of mounting or through bolts 71 are inserted into bolt holes 69 in core stack 57 into threaded engagement with a plurality of cooperating threaded bolt holes 73 provided therefor in the assembly base. Thereafter, mounting bolts 71 are torqued down to apply or otherwise exert compressive forces on opposite end faces 61, 63 of core stack 57 between the respective heads of the mounting bolts and assembly base 59. In this manner, the aforementioned compressive forces so applied on core stack 57 establish compression or pressure regions 74 encompassing bolt holes 69 and between opposite end faces 61, 63 of the core stack, and such applied compressive forces have a preselected value sufficient to hold the core stack in the desired aligned and squared condition thereof on assembly base 59 throughout the bonding process, as discussed hereinafter. It may be noted that the aforementioned compressive forces applied onto core stack 57 by mounting bolts 71 are preferably in a range of from about 400 pounds to about 600 pounds; however, it is believed that higher compressive forces may be utilized within the scope of the invention so as to meet at least some of the objects thereof.

Figure 6:
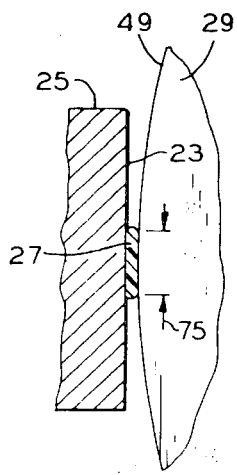
FIG. 6 is a sectional view taken along line 6—6 of FIG. 4.

After the assembly of core stack 59 on assembly base 57 with laminations 43 of the core stack in the aligned and squared condition thereof, as discussed above, the core stack may be oriented or otherwise arranged in a preselected position so that peripheral portion 49 is spaced adjacent upper surface 23 of flow wall 25 with axis 45 of the core stack being generally parallel with beaded column 27 of hardenable adhesive material 21 flowing in its preselected path downwardly on the upper surface of the flow wall. Thereafter, flow wall 25 may be moved toward core stack 59 so as to effect the touching of beaded column 27 of hardenable adhesive material 21 flowing downwardly in the preselected flow path thereof on upper surface 23 of the flow wall with peripheral portion 49 of the core stack along a preselected axial contact length 73 thereof. While flow wall 25 is illustrated herein as being movable toward core stack 59 to effect the touching of beaded column 27 of hardenable adhesive material 21 with peripheral portion 49 of the core stack, it is contemplated that the core stack may alternatively be moved toward the flow wall or that the core stack and flow wall may be simultaneously moved toward each other to effect such touching between the beaded column of hardenable adhesive material and the core peripheral portion within the scope of the invention as to meet at least some of the objects and advantageous features thereof. Furthermore, and as best seen in FIG. 4, preselected axial contact length 73 along core peripheral portion 49 with beaded column 27 of hardenable adhesive material 21 on surface 23 of flow wall 25 is illustrated as being across the entire axial length or stack height of core 29 between opposite end faces 61, 63 thereof; however and as best seen in FIG. 5, the preselected axial contact length along the core peripheral portion touched with the beaded column of the hardenable adhesive material is less than the axial length or stack height of the core. Thus, the engagement of preselected axial contact length 73 along core peripheral portion 49 and beaded column 27 of hardenable adhesive material on flow wall 25 may extend across the entire stack height of core 29 or any desired part thereof, and in practicing the invention, it may be desirable to utilize either one or both types of the preselected axial contact lengths discussed above and as illustrated in FIGS. 4 and 5, respectively. Furthermore, upon the touching together of beaded column 27 of hardenable adhesive material 21 and core peripheral portion 49 along preselected axial contact length 73 thereof, it may be noted that such touching together occurs only along a preselected contact width 75 of the beaded column, as best seen in FIGS. 6 and 7. With respect to the duration of the touching together of beaded column 27 of hardenable adhesive material 21 and core peripheral portion 49, it is believed that such touching together should occur only momentarily, i.e., for a duration of less than about two seconds with a preferred time range of from about one-quarter second to about one second being sufficient. As previously mentioned, the assembly of core stack 59 on assembly base 57 by torqued-down mounting bolts 71 effects compression regions 74 encompassing bolt holes 69 across the core stack between opposite end faces 61, 63 thereof, and it is preferred that the above discussed touching together of beaded column 27 of hardenable adhesive material 21 and core peripheral portion 49 along preselected axial contact length 73 occur between at least some of the aforementioned compression regions so established across the core stack.

Figure 8:
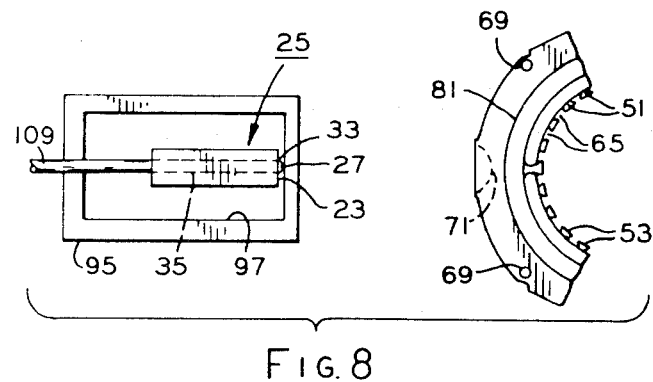
FIG. 8 is a partial top elevational view of the apparatus of FIG. 3 and illustrating the penetration of the hardenable adhesive material into the magnetic core.

Either subsequent to or simultaneously with the above discussed touching together of beaded column 27 of hardenable adhesive material 21 and core peripheral portion 49 along preselected axial contact length 73 thereof, a part of the hardenable adhesive material flowing in the beaded column thereof downwardly on upper surface 23 of flow wall 25 is transferred or otherwise transmitted or wicked by capillary action from the beaded column into an adhesive region 77 of core 29 at least adjacent the core peripheral portion and between next adjacent laminations 43 along preselected axial contact length 73 of the core, as illustrated in FIG. 8. As previously mentioned, the touching together of beaded column 27 of hardenable adhesive material 21 and core peripheral portion 49 along preselected axial contact length 73 thereof occurs between compressive regions 74 encompassing bolt holes 69 across core stack 59 between opposite end faces 61, 63 thereof; therefore, the adhesive region 77 established in response to the transfer of the hardenable adhesive material occasioned by such touching together of the beaded column thereof and the core stack is also located between at least some of the aforementioned compressive regions. As discussed in greater detail hereinafter, it is desirable to preheat core stack 59 subsequent to the aforementioned assembly thereof on assembly base 57, and by virtue of such heat in laminations 43 of the core stack, part of hardenable adhesive material 21 so transferred by capillary action into adhesive region 77 of the core stack begins to rapidly harden after migrating only a very short distance into the interlaminar surfaces of the adhesive region. In practice, it has been found that the migration distance of hardenable adhesive material 21 into the interlaminar surfaces of adhesive region 77 is not affected by the length of time beaded column 27 of the hardenable adhesive material is engaged with core peripheral portion 49 or the rate of flow of the hardenable adhesive material in the beaded column thereof when core 29 is heated to the thermoresponsive temperature level of the hardenable adhesive material. Thus, upon the touching together of beaded column 27 of hardenable adhesive material 21 and core peripheral portion 49 along preselected axial contact length 73 thereof when laminations 43 of core stack 59 are heated to the thermoresponsive temperature level of the hardenable adhesive material, it is believed that the part of the hardenable adhesive material transferred by capillary action into adhesive region 77 of the core stack will not migrate into compressive regions 74 encompassing bolt holes 69 and extending across the core stack between opposite end faces 61, 63 thereof. In this manner, the desired minimum compressibility characteristic may be attained for the now bonded together core 29. Of course, it is contemplated that hardenable adhesive material 21 may also be transferred by capillary action into an alternative core which may not have compression regions 77, such as for instance a transformer core or the like.

In one example of a core bonded in accordance with the techniques set out in the present invention, the migration or penetration distance of hardenable adhesive material 21 into core stack 57 was generally about three-eighths of an inch and covered an area of generally about three-tenths of a square inch. This migration was attained utilizing the aforementioned UNISET 801-04-01 hardenable adhesive material flowing in beaded column 27 having a width of generally about three-eighths of an inch and a length of generally about four inches on upper surface 23 of flow wall 25, and the rate of such flow across the upper surface was generally about six inches per minute. Contact width 75 of beaded column 27 was generally about three-eighths of an inch during the touching between the beaded column and core peripheral surface 49.

When hardenable adhesive material 21 has been transferred by capillary action into adhesive region 77 of core 29, as discussed above, flow wall 25 may be moved away from the core thereby to interrupt the touching of the hardenable adhesive material in beaded column 27 thereof and core peripheral portion 49 along preselected axial contact length 77 thereof; however, it is contemplated that the interruption of such touching may be effected by moving the core away from the flow wall or by moving both the core and the flow wall away from each other generally simultaneously within the scope of the invention so as to meet at least some of the objects thereof. In this vein, a possible upper time limit with respect to the duration of the touching together of beaded column 27 of hardenable adhesive material 21 and core peripheral portion 49 may be that the interruption of such touching together should occur prior to any appreciable accumulation of the hardenable adhesive material on the upper one of end faces 61, 63 of core 29 presented to the beaded column of hardenable adhesive material.

Due to the relatively short time of contact and also the nature of such contact between beaded column 27 of hardenable adhesive material 21 and core peripheral portion 49, it may be noted that there is little heat transfer from the heated core stack 59 to the beaded column of the hardenable adhesive material and flow wall 25. For instance, the continuous flow of beaded column 27 of hardenable adhesive material 21 along surface 23 of flow wall 25 serves to, in effect, fluid cool the flow wall, and as previously mentioned, surface 23 and core peripheral portion 49 are maintained in predetermined spaced apart relation during the touching together of the hardenable adhesive material in the beaded column thereof and the core peripheral portion. Furthermore, flow wall 25 remains relatively clean during use thereof since only beaded column 27 of hardenable adhesive material 21 contacts core peripheral portion 49 and since such contact is only over a very limited area on the core peripheral portion. Thus, any foreign particles, such as grease, dust, oxidized metallic particles or the like for instance, which may be present on core peripheral portion 49 may be displaced therefrom upon the touching together of the continuously flowing beaded column 27 of hardenable adhesive material 21 and the core peripheral portion, but only if such foreign particles are disposed within the area of contact along preselected axial contact length 75 of core peripheral portion and preselected contact width 75 of the beaded column of hardenable adhesive material with the core peripheral portion. Of course, any such foreign particles so displaced from core stack 29 into hardenable adhesive material 21 may be filtered therefrom.

While the above discussion of the method of transferring by capillary action hardenable adhesive material 21 from beaded column 27 thereof into core 29 was presented within the context of the touching together of the beaded column with core peripheral portion 49 along preselected axial contact length 77, it is contemplated that such touching together of the beaded column of hardenable adhesive material may be effected with other peripheral portions or surfaces of the core along similar preselected axial contact lengths thereof within the scope of the invention so as to meet at least some of the objects and advantageous features thereof. For instance, upon the above discussed aligning of laminations 43 about axis 45 on assembly base 57, inner peripheral edges of the laminations define an inner peripheral surface or portion on core 29 including teeth 51, teeth inner ends 53, and slots 65 between the teeth, and as mentioned above it is contemplated that beaded column 27 of hardenable adhesive material could be touched together with such inner peripheral portion or surface of the core. Furthermore, laminations 43 of core 29 include other peripheral edges defining openings 55 which when aligned together define bolt holes or peripheral portion or surfaces 69 through the core, and as mentioned above, it is contemplated that beaded column 27 of hardenable adhesive material 21 could be touched together with such bolt holes or peripheral surfaces. Of course, it is recognized that at least some of the hardenable adhesive material which may be transferred by capillary action into the core at bolt holes 69 thereof would necessarily have to be squeezed or otherwise displaced into adjacent portions of the core by the establishment of compressive regions 74 of the core which encompass the bolt holes.

While the foregoing discussion with respect to the transferring method of the present invention was directed toward the bonding of a bare or unwound core stack 59, it is contemplated that winding means and suitable means for insulating such may be injected, placed or otherwise positioned in the core stack prior to the bonding thereof within the scope of the invention so as to meet at least some of the objects thereof. For instance and as well known in the art, prior to the above discussed disposition of laminations 43 onto assembly base 57, the laminations may be aligned in stack 59 thereof, insulating slot liners 79 may be inserted or otherwise provided in winding receiving slots 65 of the core stack by suitable means (not shown) well known to the art, and winding means 81 comprising a plurality of sets of coil turns may be placed, injected or otherwise positioned in the winding receiving slots by suitable means, such as for instance coil placing equipment (not shown) as also well known to the art. Thereafter with slot liners 79 and winding means 81 so positioned in lamination stack 59, the stack may be disposed on assembly base 57 so as to be aligned, squared and assembled thereon by mounting bolts 71 and then bonded, as previously described.

As previously mentioned, it is contemplated that a hardenable adhesive material other than the UNISET 801-04-1 illustrated herein merely by way of example for purposes of disclosure may be utilized within the scope of the invention so as to meet at least some of the objects thereof. For instance, it is contemplated that another or an alternative hardenable adhesive material having suitable physical and chemical properties may be employed which would effect migration to a desired or suitable penetration depth into core 29 by capillary action in the same manner as discussed above but without preheating the core. Further with respect to core preheating, it has been determined through experimentation that it may not be necessary to preheat core 29 up to the thermosponse temperature of still another or alternative hardenable adhesive material having suitable physical and chemical properties to effect the migration thereof to a suitable penetration depth into the core by capillary action in the same manner as discussed above. With the preheat temperature of core 29 less than the thermoresponsive temperature of the alternative hardenable adhesive material utilized during this experimentation, it was found that the penetration depth of such alternative hardenable adhesive material may be greater than that set out by way of example hereinabove when the touching between the beaded column of the alternative hardenable adhesive material and the core is repeated several times or when the touching was maintained for a period of time greater than the preferred time period as set out hereinbefore. Of course, with no preheat or a preheat less than the thermoresponsive temperature of the alternative hardenable adhesive material, it may be necessary to subsequently apply a curing heat to the core to effect curing of the alternative hardenable material transferred thereto.

Referring again in general to the drawings and recapitulating at least in part with respect to the foregoing, apparatus 91 is shown in one form of the invention for transferring by capillary action hardenable adhesive material 21 into core 29 adapted for use in motor 31 with the core including laminations 43 in stacked relation along axis 45 and having edges defining peripheral portion 49 of the core (FIGS. 1-14). Apparatus 91 has means, such as for instance flow wall 25, for supporting the flow of beaded column 27 of hardenable adhesive material 21 downwardly thereon generally in the preselected flow path (FIGS. 3-8 and 10-12). Means, such as a double-acting air cylinder 93 or the like for instance, is operable generally for effecting engagement of core peripheral portion 49 along preselected axial contact length 73 thereof and beaded column 27 of hardenable adhesive material 21 in the preselected flow path thereof on upper surface or supporting means 23 so as to effect the transfer of a part of the hardenable adhesive material from the beaded column by the capillary action into core 29 between next adjacent laminations 43 adjacent the preselected axial contact length of the core peripheral portion (FIGS. 3, 4, 6-8 and 14).

More particularly and with specific reference to FIGS. 3 and 4, apparatus 91 is provided with a housing 95 which includes a source of hardenable adhesive material 21, such as for instance a reservoir 97 or other means for receiving the flow of the hardenable adhesive material from flow wall 25. The lower end of flow wall 25 extends into reservoir or receiving means 95, and suitable means, such as at least one connecting bolt 99 or the like for instance, is interposed between housing 95 and the lower end of the flow wall for retaining the flow wall against displacement from a preselected assembled position with the housing. In the preselected assembled position of flow wall 25, upper surface 23 thereof is disposed so as to extend generally vertically but may be tilted slightly from the vertical, as previously mentioned. Housing 95 is adjustably coupled with means, such as a threaded push rod and nut assembly 101 of air cylinder or engagement effecting means 93, for adjusting the position of upper surface 23 of flow wall 25 with respect to peripheral portion 49 of core 29 when the core is mounted in the preselected position thereof relative to the flow wall, and the housing is movably or slidably arranged on means, such as a plurality of guide rods or tracks 103 or the like for instance, for guiding the housing in the protractive and retractive movement imparted thereto by air cylinder 93. To complete the description of apparatus 91, means, such as a pump 105 or the like for instance, is provided for supplying, circulating or otherwise delivering a desired continuous flow of hardenable adhesive material 21 from reservoir 97 to upper surface 23 of flow wall 25, and the pump or supplying means has its inlet and outlet sides connected in communication with reservoir 97 and passage 35 of flow wall 25 by a pair of flexible conduits 107, 109, respectively.

In the operation of apparatus 91, assume that the component parts of the apparatus are in their at-rest or retracted positions, as best seen in FIG. 3, and that core stack 59 disposed on assembly base 57 therefor is arranged in its preselected position relative to the apparatus, as discussed in greater detail hereinafter. With apparatus 91 and core stack 59 so predeterminately arranged with respect to each other, air cylinder 93 may be actuated to protractively move or otherwise displace housing 95 on guide rods 103 from the at-rest or retracted position of the housing to its protracted or displaced position, as best seen in FIG. 4. Of course, flow wall 25 is conjointly protractively movable with housing 95, and when housing 95 and flow wall 25 are in the protracted position thereof, beaded column 27 of hardenable adhesive material 21 flowing downwardly in the preselected path thereof on surface 23 of flow wall 25 is momentarily touched with core peripheral portion 49 along preselected axial contact length 73 thereof to effect the transfer by capillary action of a part of the hardenable adhesive material from the beaded column thereof into core stack 59, as previously discussed herebefore. Further and as also discussed hereinbefore, when flow wall 25 is in its protracted position, it is preferred to maintain upper surface 23 of the flow wall in predetermined spaced apart relation with core peripheral portion 49. The duration of the touching between beaded column 27 of hardenable adhesive material 21 and core peripheral portion 49 is preferably within a preselected time range or period of from about one-quarter second to about two seconds, as previously mentioned, and at the end of such preselected time period, air cylinder 93 is again actuated to retractively move or otherwise conjointly return flow wall 25 and housing 95 on guide rods 103 from the protracted position to the retracted position thereof. Of course, upon the conjoint retractive movement of flow wall 25 and housing 95 to their retracted position, the touching between beaded column 27 of hardenable adhesive material 21 on the flow wall and core peripheral portion 49 is interrupted thereby to terminate the aforementioned transfer of the hardenable adhesive material into the core. Of course, the unused hardenable adhesive material 21 of beaded column 21 continues to flow downwardly on flow wall 25 from upper surface 23 onto lower surface 25 thereof, and from the lower surface, the flow is discharged or falls by gravity into reservoir 97 for recirculation by pump 105 through conduits 107, 109 back to flow wall 25.

Referring again in general to the drawings and recapitulating at least in part with respect to the foregoing, there is illustrated in one form of the invention a method of operating apparatus 91 which includes reservoir 97, flow wall 25 for supporting beaded column 27 of hardenable adhesive material 21 while a part thereof is being transferred by the capillary action to core 29 adapted for use in motor 31 and with the core having laminations 43 in stacked relation along axis 45 and also peripheral edges defining core peripheral portion 49 (FIGS. 1-8 and 14). In this method, hardenable adhesive material 21 is supplied, delivered or otherwise circulated from reservoir 97 thereof to flow wall 25, and beaded column 27 of the hardenable adhesive material is flowed or otherwise passed downwardly generally along the preselected flow path on the flow wall for transferring the part of the hardenable adhesive material into core 29 by the capillary action (FIGS. 3-8).

Figure 13:
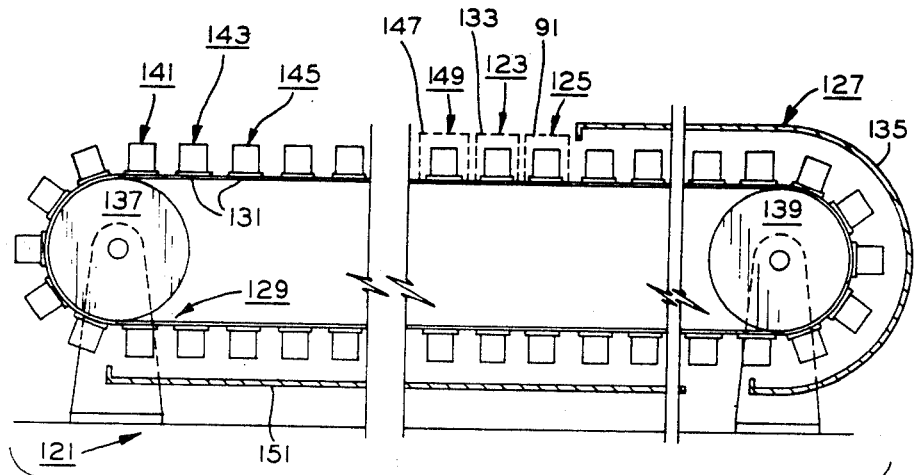
FIG. 13 is a schematic representation illustrating apparatus or an assembly line in one form of the invention for manufacturing the magnetic core of FIG. 1 and also teaching principles which may be practiced in a method of manufacturing such magnetic core in one form of the invention.

In addition to the foregoing and also in one form of the invention, other apparatus or assembly mechanism 121 is provided for manufacturing core 29 (FIG. 13). Apparatus 121 has a plurality of work stations, such as for instance at least those indicated generally at 123 and 125 at which work is performed on core 29, and means, such as an endless conveyor 129 or the like for instance, is operable generally for conveying or otherwise transporting or moving core 29 selectively through such work stations. Suitable means, such as for instance a plurality of aligned, spaced apart clamping devices 131 or the like as well known in the art, are associated so as to be conjointly movable with conveying means or conveyor device 129 for mounting assembly base 57 with core stack 29 thereon. Means, such as for instance a heating device or induction heaters 133 or the like, is provided at work station 123 for effecting preheating of core 29 upon the movement thereof to such work station by conveyor device 129, and means, such as a plurality of apparatus 91, are arranged or otherwise provided at work station 125 for transferring by capillary action hardenable adhesive material 21 into core 29 upon the movement of the core to its preselected position at such work station by conveyor device 129. Each of apparatus 91 at work station 125 includes means, such as for instance flow wall 25 or the like, for supporting the flow of beaded column 27 of hardenable adhesive material 21 downwardly in the preselected flow path thereon and also means, such as for instance air cylinder 93 or the like, for moving or otherwise actuating the flow wall toward its protracted or hardenable adhesive material transferring position so as to effect the touching of the beaded column of the hardenable adhesive material with core peripheral portion 49 along preselected axial contact length 73 thereof and thereby to effect the transfer by the capillary action of a part of the hardenable adhesive material from the beaded column into core 29 (FIGS. 3-8 and 14). If desired means, such as for instance another heating device or oven 135 or the like, may be provided at another work station 127 for curing or otherwise heating core 29 to effect the curing or hardening of hardenable adhesive material 21 transferred thereto upon the movement of the core to work station 127 by conveyor device 129 (FIG. 13); however, if reheating of the core at work station 127 is not deemed to be necessary to cure the hardenable adhesive material, then it is contemplated that such work station may either be omitted or else constituted by an insulated tunnel or the like for instance within the scope of the invention so as to meet at least some of the objects thereof.

More particularly and with specific reference to FIGS. 2-4, 13 and 14, conveyor 129 is driven or otherwise moved about a pair of spaced rollers 137, 139 therefor, and at least one of the rollers is operable or controllably driven by suitable means (not shown) to selectively or intermittently move the conveyor and clamping devices 13 in a preselected path through work stations 123, 125, 127, respectively. While conveyor 129 and rollers 137, 139 are illustrated herein for purposes of disclosure, it is contemplated that various other conveyor devices, such as for instance a turntable or the like, may be utilized within the scope of the invention so as to meet at least some of the objects thereof. Clamping devices 131 are fixedly connected or otherwise arranged on conveyor 129 at preselected spaced locations thereon and are intermittently moved with the conveyor so as to present or otherwise stop assembly bases 59 with cores 29 thereon in the preselected positions of the cores at work stations 123, 125, 127. For instance, at another work station, indicated generally at 141, clamping devices 131 may be unclamped or otherwise displaced from assembly base 57, and albeit not shown, it is contemplated that such unclamping may be automatically performed by suitable means well known to the art. Unclamped clamping device 131 may then be moved by conveyor 129 to a successive work station 143 where a finished bonded core 29 and its assembly base 57 are removed from the unclamped clamping device, and an unbonded core stack 59 on its assembly base 57 is loaded onto the clamping device. While these unloading and loading operations at work station 143 may be performed by an operator, it is contemplated that such operations may also be automatically performed by also be automatically performed by suitable means, such as robotics (not shown) or the like for instance as well known in the art, within the scope of the invention so as to meet at least some of the objects thereof. Thereafter, conveyor 129 is operable to move the loaded clamping device 131 with core stack 59 and its assembly base 57 thereon into a next successive work station, indicated generally at 145, where the core stack is straightened abou it axis 45 so as to be presented in the preselected position, and clamping device 131 is closed or otherwise operated so as to automatically clamp the core stack and its assembly base in the preselected position of the core stack onto the conveyor. Upon completion of the straightening and clamping operation at work station 145, core stack 59 on its assembly base 57 is moved by conveyor 129 into preheating work station 123 where the core stack is preheated by heating device 133 to at least the thermoresponsive temperature of hardenable adhesive material 21, as previously mentioned. Either in addition to the preheating performed at work station 123 or in the alternative in place of such preheating, it is contemplated that another work station, as indicated generally at 147, may be provided for core stack preheating purposes, as previously discussed, within the scope of the invention so as to meet at least some of the objects thereof. For instance, the leads of winding means 81 of core stack 59 may be electrically connected with suitable means 149 for energizing the winding means thereby to effect preheating of the core stack in a manner known to the art. Of course and as previously mentioned, preheating stations 123, 149 may be successively employed in conjunction with each other or one of such preheating stations may be employed to the exclusion of the other thereof, as desired.

Figure 14:
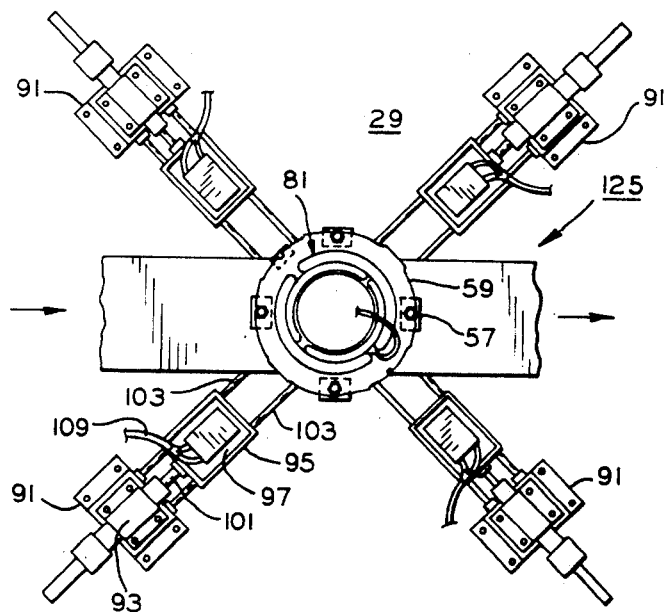
FIG. 14 is a top elevational view illustrating one work station of the assembly line of FIG. 13 with a plurality of the apparatus of FIG. 3 located at such one work station.

Subsequent to the preheating of core stack 59, conveyor 129 may be operated to move the core stack on its assembly base 57 toward and into work station 125 with the core stack being presented in the preselected position thereof at such work station, as best seen in FIG. 14. With core stack 59 so disposed in its preselected position at work station 125, each of apparatus 91 may be operated in the manner discussed in detail hereinabove to effect the transfer by capillary action of a part of hardenable adhesive material 21 from beaded column 27 flowing downwardly on flow wall 25 into the core stack by touching the beaded column and core peripheral portion 49 along preselected axial contact length 73 thereof. Upon the completion of the hardenable adhesive material transferring operation of work station 125, the now bonded core stack 59 on its assembly base 57 is moved away from work station 125 and may continue through work station 127 where the hardenable adhesive material 21 transferred to the core stack may be cured by further heating it in response to heat generated by heating device 135 at work station 127 if such work station is included in apparatus 121. Thereafter, the bonded core stack 59 may be delivered by conveyor 129 through another work station, indicated generally at 151, to effect cooling of the core stack by suitable means, such as for instance air moving fans or the like (not shown) for flowing cooling air over the heated core stack. From cooling work station 151, the finished bonded core stack 59 or core 21 is returned to work station 41 where clamping means 131 are unclamped, as previously discussed. While only one core 29 was discussed above with respect to its movement through the various work stations of assembly line or apparatus 121, it is apparent that a plurality of such cores may be successively moved through such various work stations in the same manner within the scope of the invention so as to meet at least some of the objects thereof. Upon the unloading of core 29 and its assembly base 57 from apparatus 121, mounting bolts 71 may be threadedly removed from the assembly base thereby to remove the compressive forces exerted by such mounting bolts and effect the disestablishment of compressive regions 74 encompassing bolt holes 71 between opposite ends 61, 63 of core 29.

Referring again in general to the drawings and recapitulating at least in part with respect to the foregoing, there is illustrated in one form of the invention a method of manufacturing core 29 adapted for use in motor 31 with the core including laminations 43 defining core peripheral surface 49 (FIGS. 2–8, 13 and 14). In this method, laminations 43 are aligned in stacked relation along axis 45, and opposite end faces 61, 63 of core 29 are squared in the stacked relation of the lamination (FIGS. 3 and 4). A plurality of preselected separated compression or pressure regions 74 are established in angularly spaced relation about axis 45 of laminations 43 in the stacked relation thereof and between opposite end faces 61, 63 of core 29 (FIG. 3). Core 29 is then heated (FIG. 13), and hardenable adhesive material 21 is flowed downwardly in beaded column 27 thereof generally along its preselected flow path a wall means, such as flow wall 25 for instance, for supporting the beaded column of hardenable adhesive material (FIGS. 3–8). At least one of wall means 25 and core 29 is moved toward the other thereof so as to touch together a selected contact surface 75 on beaded column 27 of hardenable adhesive material 21 supported on the wall means with core peripheral surface 49 along preselected axial contact length 73 thereof and angularly between at least some of the compressive regions of the core, and the core peripheral surface and the wall means are preferably maintained in predetermined spaced apart relation (FIGS. 3–8). A part of hardenable adhesive material 21 in beaded column 27 thereof is transferred by capillary action into an adhesive region 77 of the core generally adjacent core peripheral surface 49 between next adjacent laminations 43 along preselected axial contact length 73 of the core peripheral surface upon the touching thereof with selected contact surface 75 of the beaded column of hardenable adhesive material (FIGS. 6–9).

Figure 2:
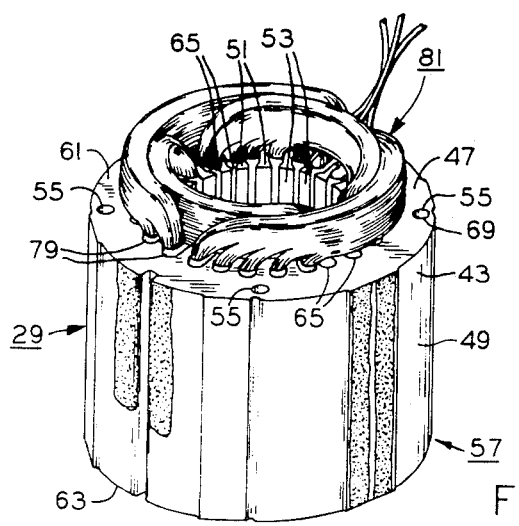
FIG. 2 is a perspective view of the magnetic core of FIG. 1 removed from the hermatic compressor.
Figure 9:
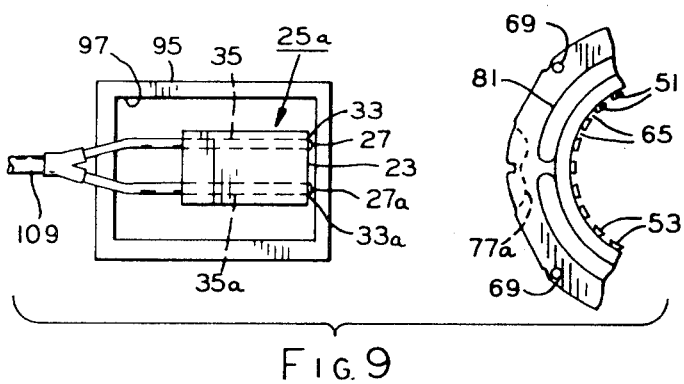
FIG. 9 is a partial top elevational view of alternative embodiment of the apparatus of FIG. 3 also in one form of the invention and illustrating the penetration of the hardenable adhesive material into the magnetic core.

With further reference in general to the drawings, there is also illustrated in one form of the invention laminated core 29 for use in motor 31 (FIGS. 1 and 2). Core 29 has laminations 43 thereof in stacked relation along axis 45 with the individual laminations each having a number of angularly spaced apart apertures 55 aligned to define a number of selected passageways 69 extending axially through the core, and the laminations have pressure regions 74 disposed in the vicinity of the selected passageways adapted to receive predetermined compressive forces applied thereto (FIGS. 1-4). A plurality of lamination adhesive regions 77 are located between at least some next adjacent laminations 43 and angularly between at least some of pressure regions 74 (FIGS. 8 and 9). Adhesive regions 77 have hardened adhesive material 21 adhering to the at least some next adjacent laminations 43 with the size of the adhesive regions being primarily determined by the width of selected contact surface 75 of beaded column 27 of hardenable adhesive material 21 in an unhardened state fed to the adhesive regions by capillary action from an associated peripheral surface of core 29 whereby the adhesive regions allow pressure regions 74 to be effective for a range of the predetermined compressive forces applied thereto (FIGS. 6-9).

Referring now to FIG. 9, another flow wall 25a is shown in one form of the invention having generally the same component parts and functioning generally in the same manner in apparatus 91 as the previously discussed flow wall 25, and while meeting at least some of the objects set out hereinbefore, it is believed that flow wall 25a as utilized with apparatus 91 may also have indigenous objects as will be in part apparent and in part pointed out in the following discussion.

Flow wall 25a has a pair of passages 35, 35a connected in communication with conduit 107 and which include a pair of spaced apart outlet ports 33, 33a intersecting with upper surface 23 of the flow wall, respectively. Thus, passages 35, 35a each receive a supply or flow of hardenable adhesive material 21 from pump 105 through conduit 107, and such hardenable adhesive material is discharged or otherwise passed through outlet ports 33, 33a so as to be directed onto upper surface 23 of flow wall 25a. Thus, as the flows of hardenable adhesive material 21 through passages 35, 35a are passed onto upper face 23 of flow wall 25a, it may be noted that the hardenable adhesive material is formed, developed or otherwise established into a pair of predeterminately spaced apart beaded columns 27, 27a of the hardenable adhesive material flowing downwardly in a pair of generally elongate predeterminately spaced apart flow paths along the upper surface. While passages 35, 35a and their outlet ports 33, 33a are illustrated herein as being generally of the same size and shape, it is contemplated that one of such passages may be sized and/or shaped differently than the other thereof so that the beaded column of hardenable adhesive material flowing therefrom may also be of a size and/or shape different than its companion beaded column within the scope of the invention so as to meet at least some of the objects thereof. When the touching together of side-by-side beaded columns 27, 27a of hardenable adhesive material 21 on flow wall 25a with core peripheral portion 49 along preselected axial contact length 73 thereof is occasioned between compressive regions 74 encompassing bolt holes 69 across core stack 59 between opposite end faces 61, 63 thereof, a part of the hardenable adhesive material of each beaded column is transferred by capillary action therefrom into the core thereby to establish an adhesive region 77a therein generally in the same manner as previously discussed. While adhesive region 77a illustrates the transferred parts of the hardenable adhesive material 21 as flowing or migrating together in such adhesive region, it is contemplated that beaded columns 27, 27a of the hardenable adhesive material may be predeterminately spaced apart on flow wall 25a a distance great enough to provide two separated adhesive regions in core 29 in which the transferred parts of the hardenable adhesive material are isolated from each other within the scope of the invention so as to meet at least some of the objects thereof.

Referring now to FIGS. 10-12, another alternative flow wall 161 is shown in one form of the invention having generally the same component parts and functioning generally in the same manner in apparatus 91 as the previously discussed flow wall 25, and while meeting at least some of the objects set out hereinbefore, it is believed that flow wall 161 as utilized with apparatus 91 may also have indigenous objects as will be in part apparent and in part pointed out in the following discussion.

Flow wall 161 is provided with a plurality of separate upper surfaces 163 which are contiguous along a margin 165 with a plurality of separate lower surfaces 167, and a plurality of pairs of spaced apart outlet ports 169 in the flow wall have one of the ends thereof intersecting with upper surfaces 163 while the other of the ends thereof intersect with a passage 171 in the flow wall communicated with conduit 107. A lower end 173 of flow wall 161 is rotatably engaged with a seat 175 provided therefor in reservoir 97 of housing 95, and a pin 177 extending from the seat is received in a cooperating opening 179 therefor intersecting with the lower end of the flow wall. Thus, flow wall 161 is rotatably movable or otherwise indexed about pin 177 and flow wall seat 175, as discussed in greater detail hereinafter. An upper end or end portion 181 of flow wall is rotatably and supportably arranged with a support arm or assembly 183 which is also fixedly connected with or carried by housing 95 of apparatus 91. Support arm 183 has a nipple 185 therein which communicates passage 171 of flow wall 161 with conduit 107. A spring biased detent 187 is carried by support arm 183, and the detent is biased toward indexing or latching engagement with a plurality of notches 189 provided in upper end portion 181 of flow wall 161. To complete the description of flow wall 161, suitable ratcheting or indexing means (not shown) of a type well known in the art may be drivingly associated with the flow wall to effect indexing rotation thereof about seat 175 and pin 177. Upon such indexing rotation, detent 187 is urged into successive notches 189 thereby to index or otherwise locate successive ones of upper surfaces 163 into preselected positions for presenting side-by-side beaded columns of hardenable adhesive material flowing downwardly thereon from outlet ports 169 to a core for the transfer into a core by capillary action, as previously discussed. While pairs of outlet ports 169 of generally the same size and shape are illustrated in flow wall 161 for purposes of disclosure, it is contemplated that more or less outlet ports having different sizes and/or shapes may be utilized in different ones of upper surfaces 165 of the flow wall within the scope of the invention so as to meet at least some of the objects thereof. Therefore, it is also contemplated that different shaped adhesive regions as well as those illustrated at 77, 77a in FIGS. 8 and 9 may be established in core 29 from different sized and/or shaped beaded columns of hardenable adhesive material presented on different ones of upper surfaces 165 of flow wall 161 within the scope of the invention so as to meet at least some of the objects thereof. While flow wall 161 is illustrated as being selectively indexed so as to present the beaded columns of hardenable adhesive material for transfer by capillary action of a part of the hardenable adhesive material therefrom to successive cores, it is also contemplated that flow wall be stationary, i.e. not indexed, wherein a plurality of cores may be moved relative to the flow wall into touching engagement with the beaded columns of hardenable adhesive material on at least some of upper surfaces 165 of the flow wall within the scope of the invention so as to meet at least some of the objects thereof. Furthermore, it is also contemplated that both flow wall 161 and a core 27 in its preselected position may be indexed so as to present beaded columns 27, 27a of either the same size or different sizes on the flow wall to different angularly located peripheral positions or sections of the core.

Subsequent to the manufacture of core 29, as discussed hereinbefore, such core may be mounted or otherwise assembled generally in cantilever fashion by a plurality of through bolts or mounting bolts 191 onto an end frame 193 of a hermetic compressor assembly or unit 195, and a rotor 197 is suitably disposed within bore 67 of the bore with a rotor shaft 199 connected generally in cantilevered fashion so as to rotatably drive parts of the compressor unit (not shown) associated therewith, as best seen in FIG. 1. Of course, upon the assembly of core 29 onto compressor end frame 193, compressive forces are again exerted on compressive regions 74 of the core by the torquing-down of through bolts 191 extending through bolt holes 69 of the core into threaded engagement with the compressor end frame. However, it may be noted that the compressive forces exerted on compressive regions 74 of core 29 when it is so mounted to compressor end frame 193 are of a much greater magnitude, i.e., up to at least 1200 pounds for instance, than the magnitude of the compressive forces exerted on such compressive regions when such core is mounted by mounting bolts 71 to assembly base 59 during the manufacture of such core, as discussed hereinabove.

In the light of the foregoing, it is apparent that a novel core 29, novel apparatus 91 and 121, a novel method of operating such apparatus, a novel method of presenting hardenable adhesive material 21, and a novel method of transferring such hardenable adhesive material by capillary action have been presented respectively meeting at least some of the objects and advantages set out herein, as well as other, and it is contemplated that changes as to the precise arrangements, shapes, details and connections of the component parts of such core and apparatus, as well as the precise steps and order thereof of such methods, may be made by those having ordinary skill in the art without departing from the spirit of the invention or the scope thereof as set out by the claims which follow.

What I claim as new and desire to secure by Letters Patent of the United States is:

1. Apparatus for applying a hardenable fluid adhesive material to at least one preselected peripheral portion of an inductive device laminated magnetic core, and transferring the fluid material into the core, the apparatus comprising:

first means for supporting a downwardly flowing beaded column of the fluid material in at least one preselected flow path;

second means for moving the first means and thus such flow path between spaced apart protracted and retracted positions;

third means for supporting the laminated magnetic core in a preselected position so that the edges of laminations therein are oriented transversely with respect to the direction of flow of the flowing beaded column;

receiving means for receiving fluid flowing from the bottom of the beaded column; and supply means for supplying fluid from the receiving means to the first means and for establishing and maintaining the downwardly flowing beaded column;

said second means being operable for moving the flow path to its protracted position while the core is in its preselected position, and for effecting surface to surface engagement of the flowing beaded column and the preselected peripheral portion of the core so that the fluid in the column flows downwardly across the edges of the transversely disposed core laminations whereby fluid from the column is transferred by capillary action directly from the flowing column into the core between predetermined ones of next adjacent core laminations;

said second means being effective for maintaining the first means and the core in spaced apart relation at all times so that the preselected peripheral portion of the core is touched only by the fluid in the beaded column while the flow path is in its protracted position.

2. The apparatus of claim 1 wherein said first means includes channel means that define the preselected flow path.

* * * * *